May 7, 1957  W. F. CLARK  2,791,002
OUTDOOR THEATER AND SCREEN STRUCTURE
Filed April 19, 1954  2 Sheets-Sheet 2

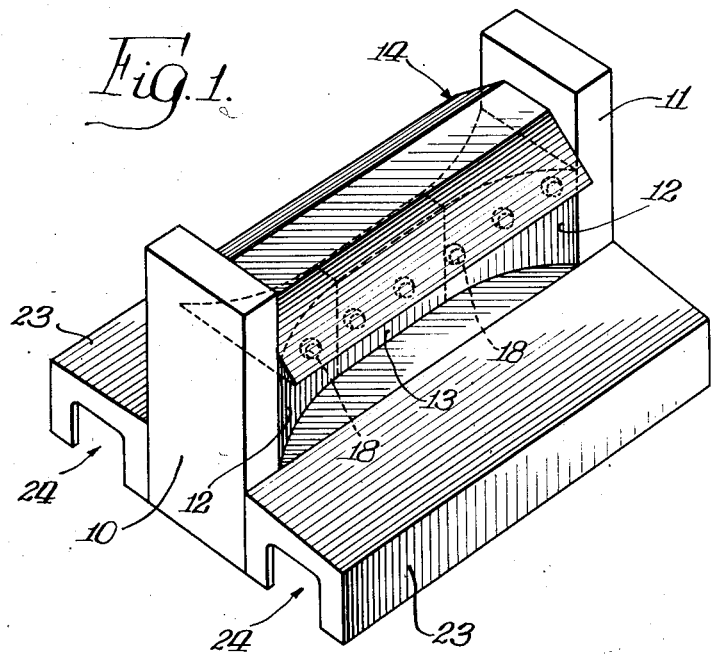
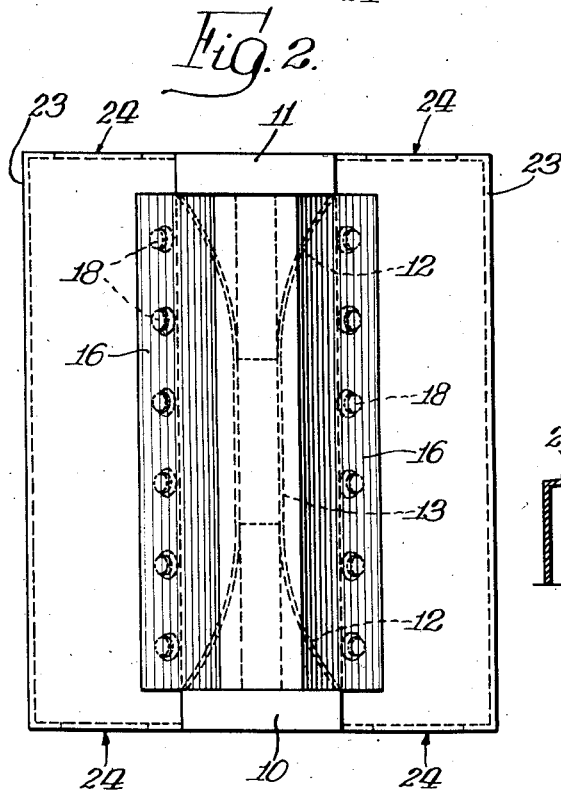
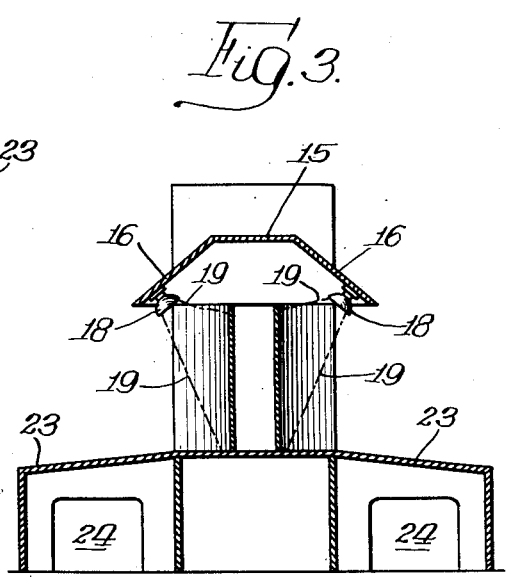

INVENTOR.
William F. Clark,
BY Schroeder, Hofgren,
Brady and Wegner, Atty's.

United States Patent Office 2,791,002
Patented May 7, 1957

2,791,002

OUTDOOR THEATER AND SCREEN STRUCTURE

William F. Clark, Chicago, Ill.

Application April 19, 1954, Serial No. 423,944

8 Claims. (Cl. 20—1.12)

This invention relates to an outdoor theater and more particularly to the form of screen structure and the arrangement of parking areas for automobiles permitting occupants thereof to view a picture on a screen.

Outdoor theaters showing motion pictures have become quite popular in recent years. One difficulty in showing such pictures is that ordinarily the production cannot commence until substantially total darkness or at least deep twilight has occurred. In some of the summer months, even in the northern portions of the country, total darkness does not occur until a late hour, making the closing time of the theater quite late.

The present invention provides a screen structure permitting the starting of a feature picture before total darkness and during evening twilight. The structure supporting the screen is so formed that the screen itself is mounted somewhat like a shadowbox. Natural light is in part shielded from direct impingement upon the screen surface by the screen structure. Artificial lighting is employed to brighten the screen surface. Contrary to expected operation, the amount of light artificially placed on the screen is decreased as darkness approaches. It has thus been found that the picture can be viewed during the twilight hours and as a result, the theater can be opened and the picture showing started much sooner than otherwise has been possible.

In certain localities a site for a theater may be best suited to receive automobiles in a number of parking areas each with its own viewing screen. Some theaters have been built with two screens at a center focal point and others have been constructed with as many as three parking areas, each having its adjacent screen. The present screen structure provides a novel means by which the parking areas may be served from a single entrance. This avoids the necessity of duplicating the box office structure. Additionally, the structure permits late comers to pass the box office and proceed to a parking area without disturbing the patrons already viewing the motion picture showing.

Exemplary embodiments of the present invention are illustrated in the accompanying drawing in which:

Fig. 1 is a perspective view of one screen structure of this invention employing the principles and features of the invention;

Fig. 2 is a top plan view of the screen illustrated in Fig. 1;

Fig. 3 is a vertical sectional view taken substantially through the center of the screen structure shown in Figs. 1 and 2 illustrating the inner structure thereof;

Figure 4:
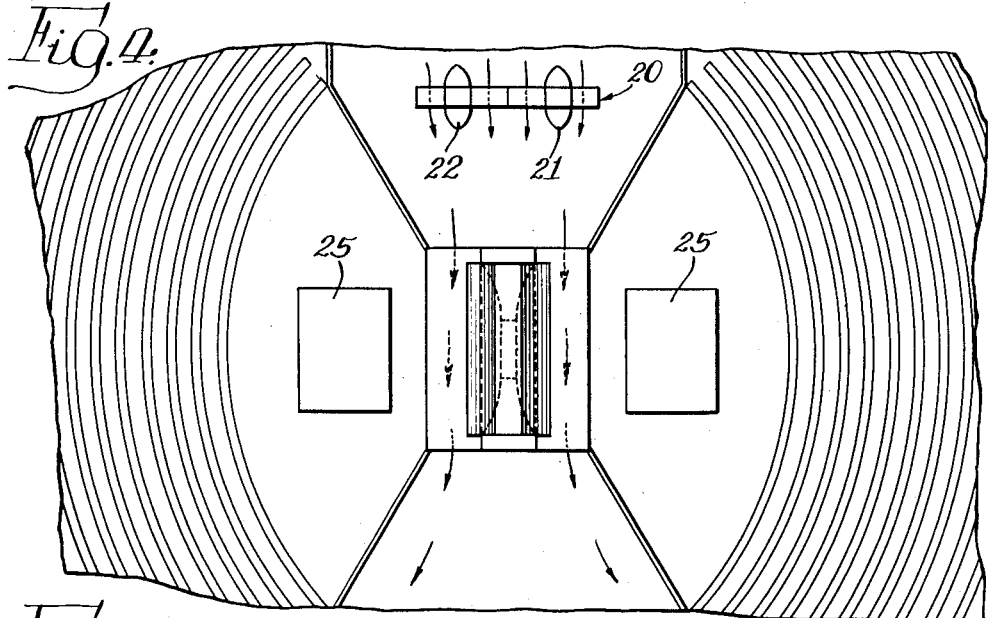
Fig. 4 is a fragmentary plan view on a small scale of a theater employing a central screen and an automobile parking area on either side of the screen, according to the present invention.

The principal features of the present screen structure may be utilized in an outdoor theater whether there is to be one, two or three screens and adjacent parking areas. The illustrated screen structure is one of the double type, in other words, having a screen on either side so that cars parked on either side of the screen will permit occupants to view a picture projected on the screen.

The screen structure is in substance somewhat like a building in that it has a pair of columns 10 and 11 extending upwardly from ground elevation to support a screen structure between them. In the present invention, the outer areas 12 of the screen structure are curved from a point near the edge of the column inwardly toward a plane passing through the centers of the columns. A central portion 13 of the screen structure forms with the outwardly curved portions a continuous wide screen area, sufficiently wide to permit showing of three dimensional pictures thereon of the "Cinemascope" variety. The center section 13 may be raised and lowered by a suitable drive which may be hydraulic or electric so that it may be changed from a flat screen to one which is curved, permitting this section to be used for the showing of 3–D pictures.

The screen surface is of a highly reflective character in order that persons parked at the extremities of the parking area may view a sharply defined picture. In order that the natural light will not interfere with the showing of the picture in the twilight hours, the screen structure is provided with a roof 14 which shields the screen at least in part from direct exposure to the natural light. This roof has a top flat portion 15 and downwardly extending overhanging portions 16 extending a considerable distance out over the screen toward the adjacent parking area. In showing the usual type of motion pictures, the central portion of the screen is used so that the roof provides a shadowbox-like effect. The large columns 10 and 11 also shield the screen from direct exposure to natural light.

It has been found that a motion picture may be shown outdoors in the twilight portion of the evening, if the screen surface is illuminated by artificial light. The intensity of the light should be greatest when the natural light is greatest and diminish as the natural light diminishes. In order to brighten the screen, a plurality of light fixtures 18 are fixed in position under the extended canopy portion 16 of the roof. These lights are directed onto the screen as shown by the dot and dash lines 19 in Fig. 3. Ordinarily, these lights are controlled by a dimmer of the usual rheostat type. The dimmer may be motor driven and in turn controlled by an electric eye positioned so as to be sensitive to the amount of natural light from the heavens. As the light diminishes, the dimmer will cut down upon the brightness of the artificial lights 18. As darkness approaches, less artificial light is reflected upon the surfaces in order that the picture may be seen clearly by those parked in the adjacent parking area.

This screen structure may be used for a single screen theater, although it is herein illustrated as one of a double or triple screen variety.

Figure 5:
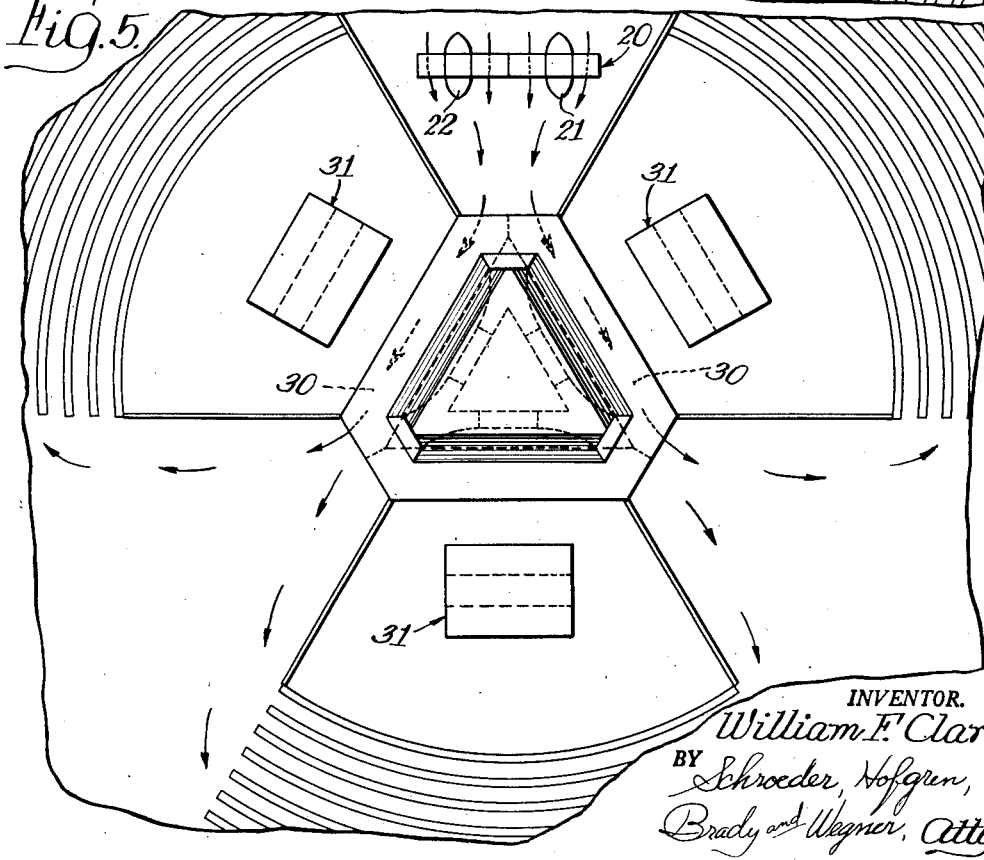
Fig. 5 is a fragmentary plan view of another theater arrangement illustrating a central screen having three reflective screen surfaces and three automobile parking areas, one for viewing each screen.

In Figs. 4 and 5, there is illustrated a theater arrangement for a double and a triple screen theater, respectively. In each of these theater arrangements, a single entrance box office is required. Thus a box office 20 is illustrated with booths 21 and 22, past which the incoming automobiles may be stopped for the payment of admission charge. The automobiles pass in accordance with the directional arrows illustrated on Figs. 4 and 5. In each instance, the automobiles pass through the base of the screen structure as illustrated. The base of the screen is provided with an enlarged portion 23 having therein a tunnel-like passage 24 through which automobiles may pass in gaining admittance to a parking area.

In a double screen theater, there are two such passages 24 arranged generally parallel and one on either side of the columns 10 and 11. As illustrated in Fig. 4, automobiles pass through the base of the screen structure and then into the parking areas on one side or the other of the screen. These incoming automobiles thus do not disturb the patrons already viewing the picture and their lights cannot interfere with the showing of the picture on the screen. The projection booths 25 are mounted close to the screen structure and may house various other facilities, such as food concessions and storage rooms.

In the triple theater illustrated in Fig. 5, the screen structure is built in generally triangular plan. The automobile passages 30 extend along the base of the triangle and each passage permits automobiles to gain admittance to a pair of parking areas. In such a theater one of the parking areas may be filled before another, thus utilizing the particular direction that a screen faces in the early evening hours and later filling the other areas after the sun recedes further and darkness approaches. Each screen has its own projection booth 31 which also houses other facilities. In all of the theater arrangements the canopied or roofed screen structures are utilized along with the artificially controlled lighting.

In each of the theater arrangements, a single entrance can suffice for serving all of the parking areas. Exits can be provided as the area will permit and ordinarily the exits will not be back through the main entrance, but be separate therefrom. With the present structure, outdoor theaters may start their performances early in the summer evenings and the length of an evening's performance can be increased permitting more business to be handled during a given evening.

The foregoing detailed description has been given for clearness of understanding only, and no unnecessary limitations should be understood therefrom, for some modifications will be obvious to those skilled in the art.

I claim:

1. In an outdoor theater having an automobile parking area to permit automobile occupants to view a picture, a screen structure including an upright frame, a reflective screen surface mounted on a portion of the frame, a roof on the frame extending outwardly from the screen surface toward the parking area and outwardly extending sidewalls cooperating with the roof to shade the screen at least in part against direct exposure to natural light, a source of artificial light mounted under said roof and means directing said light onto said screen surface artificially to lighten the screen in direct proportion to the amount of natural light on the screen.

2. An outdoor theater as specified in claim 1 wherein said screen surface has curved peripheral portions joining the sidewalls with a central screen portion, said screen portions together forming a generally continuous curved screen, and the roof extends outwardly toward the parking area beyond said sidewalls.

3. In an outdoor theater having an automobile parking area to permit automobile occupants to view a picture, a screen structure including an upright frame, an enlarged base structure below said upright frame and having at least a pair of tunnel-like passages therein for through passage of automobiles entering into the parking area, a reflective screen surface mounted on a portion of the frame, a roof on the frame extending outwardly from the screen surface toward the parking area to shade the screen at least in part against direct exposure to natural light.

4. An outdoor theater as specified in claim 3 wherein the base structure is triangular in plan and said passages extend along at least 2 sides of the base, three automobile parking areas extend outwardly from the screen structure and a separate screen surface on said frame faces each parking area, access to the parking areas being through said passages in the base structure.

5. In an outdoor theater having a pair of automobile parking areas to permit automobile occupants to view a picture, a screen structure between said parking areas and including an upright frame, a reflective screen surface mounted on either side of the frame, each facing one parking area, an enlarged base supporting said screen structure with tunnel-like passages therethrough for passage of automobiles from an entrance to the theater to said parking areas and a roof on the frame extending outwardly from each screen surface toward the adjacent parking area to shade the screens at least in part against direct exposure to natural light permitting the showing of a picture on the screen prior to natural darkness.

6. An outdoor theater as specified in claim 5 wherein a plurality of artificial lights are positioned under said roof directed upon the adjacent reflective screen surface to illuminate the screen and means are provided to decrease the intensity of said illumination with diminishing natural light.

7. In an outdoor theater having three adjacent automobile parking areas to permit automobile occupants to view a picture, a screen structure between said parking areas with the areas extending radially away from the structure, an enlarged base supporting said screen structure triangular in plan with automobile tunnel-like passages therethrough permitting access to said parking areas from an entrance to the theater, said structure including a three-sided upright frame with a reflective screen surface on each side facing one of the parking areas, a roof on the upright frame having a portion extending outwardly over each screen to shade the screens at least in part from direct exposure to natural light permitting the showing of pictures on the screens prior to natural darkness.

8. An outdoor theater as specified in claim 7, wherein a source of artificial light is positioned under said roof directed upon the adjacent reflective screen surface to illuminate the screen and means are provided to decrease the intensity of said illumination with diminishing natural light.

References Cited in the file of this patent

UNITED STATES PATENTS

| 528,373 | Von Kilanyi | Oct. 30, 1894 |
| 1,839,617 | Tiffany | Jan. 5, 1932 |
| 1,909,537 | Hollingshead, Jr. | May 16, 1933 |
| 2,369,143 | Hehn | Feb. 13, 1945 |

OTHER REFERENCES

Architectural Forum, November 1943, page 124.
Architectural Forum, April 1944, page 6.
The Drive-in-Theater, Radio Corporation of America, Camden, New Jersey, pages 5 and 7, Jan. 15, 1945.